Sept. 10, 1963
J. H. EDWARDS
3,103,659
ILLUMINATED INDICATING DEVICES
Filed Oct. 30, 1959
4 Sheets-Sheet 1
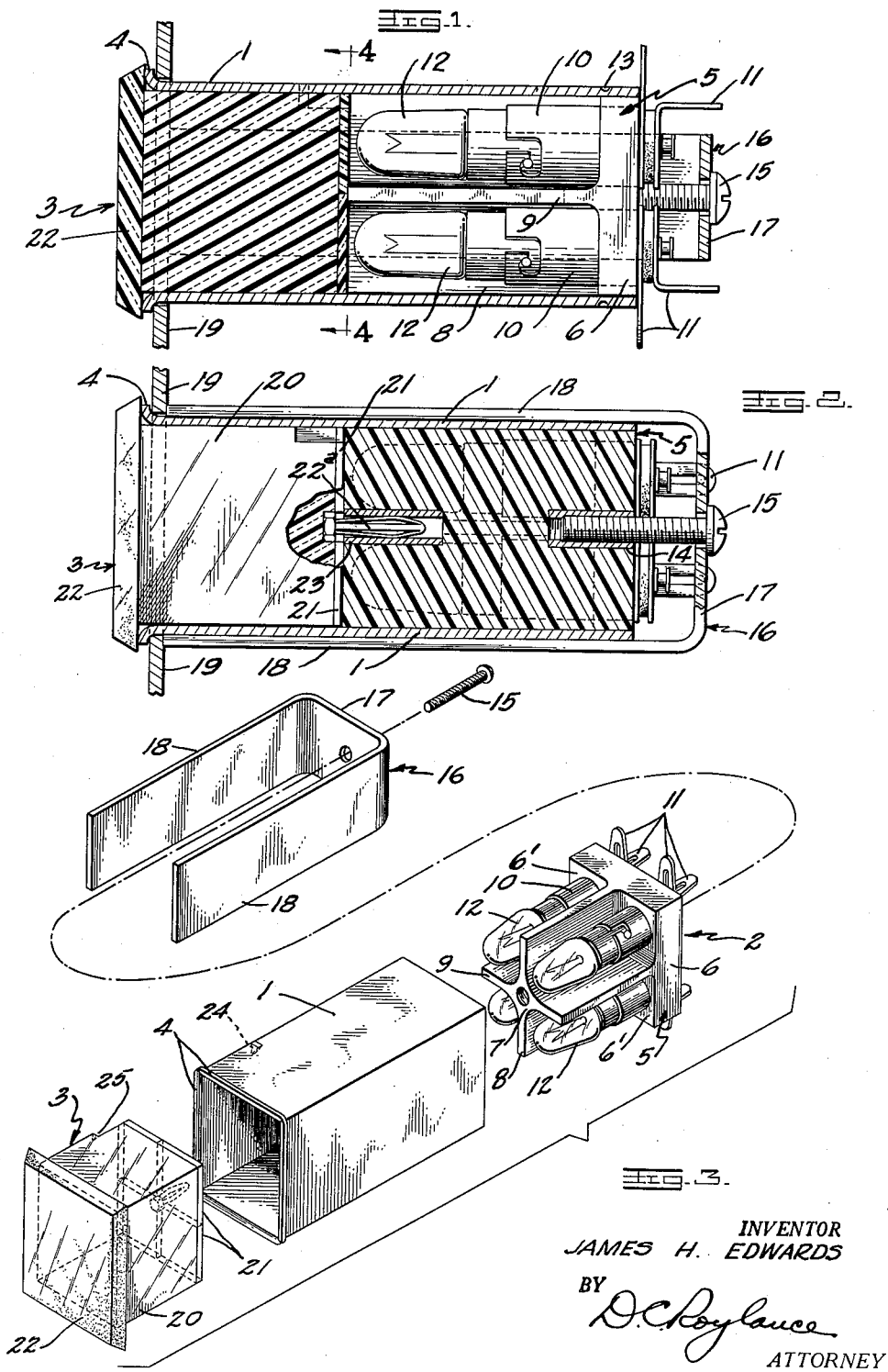
INVENTOR
JAMES H. EDWARDS
BY
D.C.Roylance
ATTORNEY Sept. 10, 1963    J. H. EDWARDS    3,103,659
ILLUMINATED INDICATING DEVICES
Filed Oct. 30, 1959    4 Sheets-Sheet 2
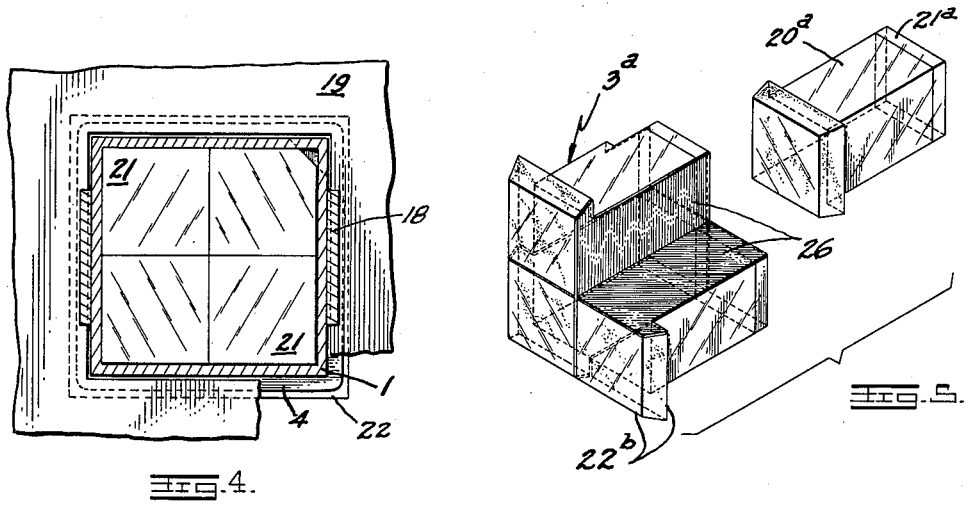
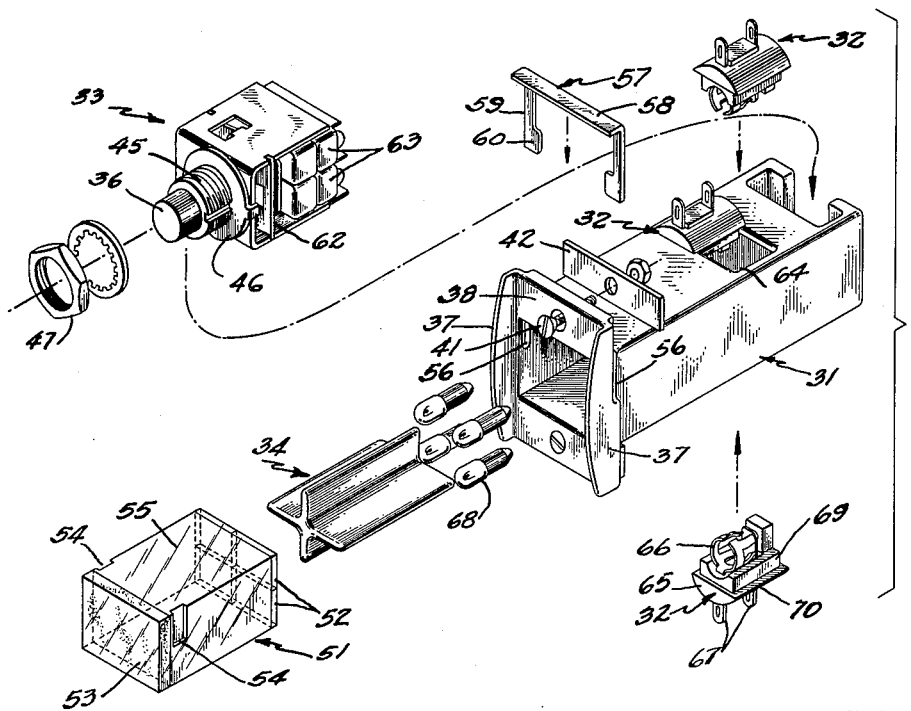
INVENTOR
JAMES H. EDWARDS
BY
D.C.Roylance
ATTORNEY Sept. 10, 1963
J. H. EDWARDS
3,103,659
ILLUMINATED INDICATING DEVICES
Filed Oct. 30, 1959
4 Sheets-Sheet 3
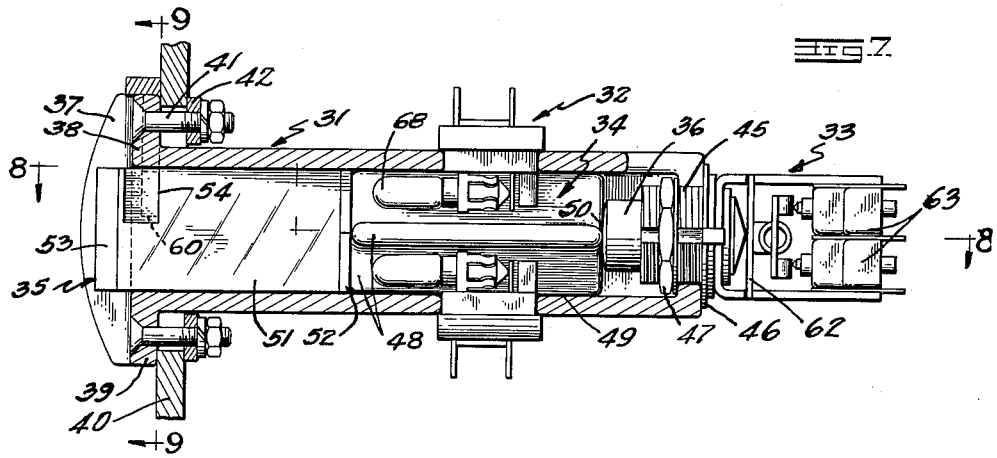
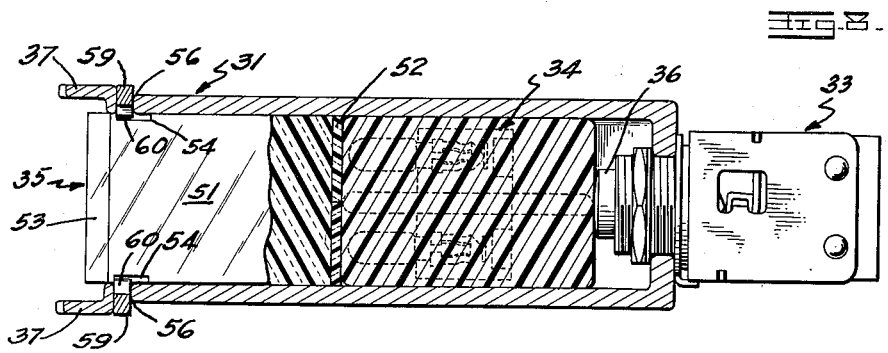
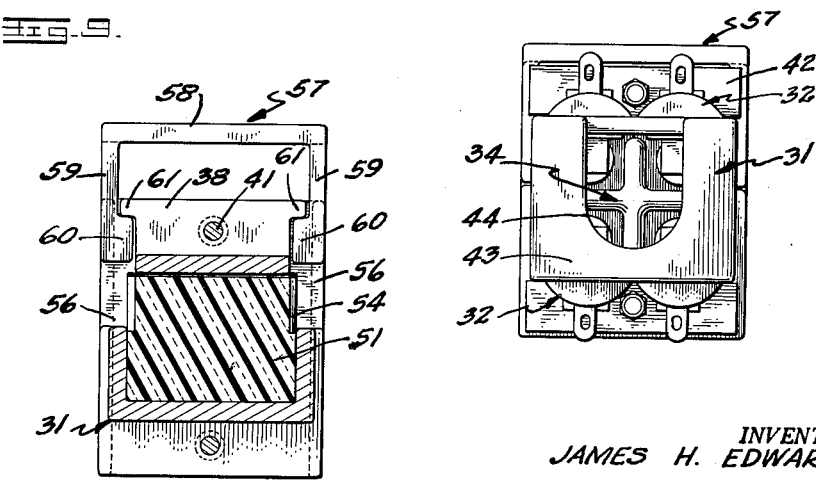
INVENTOR.
JAMES H. EDWARDS
BY
ATTORNEY

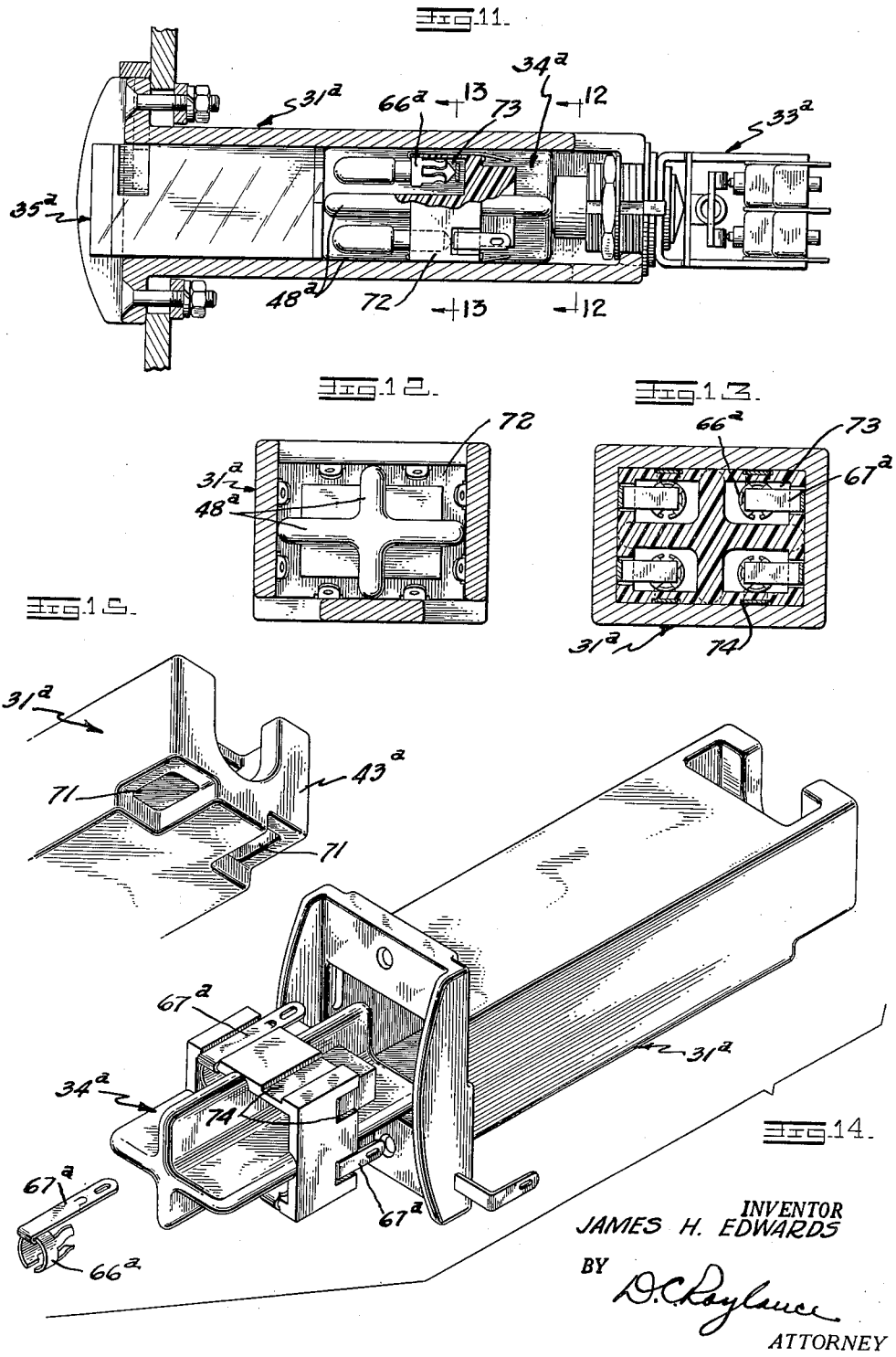

United States Patent Office 3,103,659
Patented Sept. 10, 1963

3,103,659
ILLUMINATED INDICATING DEVICES
James H. Edwards, Newton, Conn., assignor to American Machines & Foundry Company, a corporation of New Jersey
Filed Oct. 30, 1959, Ser. No. 849,947
15 Claims. (Cl. 340—378)

This invention relates to illuminated indicators. In one form, the invention provides an illuminated indicator, certain elements of which are movable and especially adapted for association with an electrical switch to actuate the same. The invention accordingly also relates to combined illuminated indicators and electrical switches.

Various types of illuminated indicators have been proposed which are intended to provide various indications, representative of operation sequences, condition of apparatus, and so forth, in response to selective energization of light sources. Such prior-art devices have not been entirely satisfactory, however, in part because of their relatively complex nature and also because of other disadvantages, such as the inability to withstand the rigors of severe operating conditions.

A general object of the invention is to devise a simple, easily assembled illuminated indicator characterized by increased dependability and long operating life.

Another object is to provide an improved combined illuminated display device and electrical switch.

A further object is to provide a combined illuminated display device and electrical switch wherein the switch is actuated manually via a plurality of elements which form the illuminating means.

In order that the manner in which these and other objects are attained, in accordance with the invention, can be understood in detail, reference is had to the accompanying drawings, which form a part of this specification, and wherein:

FIG. 1 is a longitudinal sectional view, with some parts shown in elevation, of an illuminated indicator in accordance with one embodiment of the invention;

FIG. 2 is a longitudinal sectional view, taken on a plane at right angles to that of FIG. 1, illustrating the same device;

FIG. 3 is an exploded perspective view of the device of FIG. 1;

FIG. 4 is a transverse sectional view taken on line 4—4, FIG. 1;

FIG. 5 is an exploded perspective view illustrating a modified form of light transmitting means useful in the device of FIGS. 1–4;

FIG. 6 is an exploded perspective view of a combination illuminated indicator and switching device constructed in accordance with another embodiment of the invention;

FIG. 7 is a view, partly in elevation and partly in longitudinal section, of the device of FIG. 6 with certain movable parts in one extreme position;

FIG. 8 is a longitudinal sectional view taken on line 8—8, FIG. 7, with some parts in elevation, showing the movable parts in another extreme position;

FIG. 9 is a transverse sectional view taken on line 9—9, FIG. 7, but illustrating one element in a different position than in FIG. 7;

FIG. 10 is a rear elevational view of the device of FIG. 7, but with the switch unit removed;

FIG. 11 is a longitudinal sectional view, with some parts shown in elevation, of a combination illuminated indicator and switching device constructed in accordance with another embodiment of the invention;

FIG. 12 is a transverse sectional view taken on line 12—12, FIG. 11;

FIG. 13 is a transverse sectional view taken on line 13—13, FIG. 11;

FIG. 14 is an exploded perspective view of certain parts of the device of FIG. 11, and FIG. 15 is a fragmentary detail view, in perspective, of a portion of the casing of the device of FIG. 11.

Referring now to the drawings in detail, FIGS. 1–4 illustrate, as a simplified embodiment of the invention, an indicator device embodying a single display surface selectively illuminated in any of several colors. The device includes a housing 1, a lamp assembly 2 and light transmitting means 3.

Housing 1 is in the form of an elongated tube having a square transverse cross-section, one end portion thereof being flared outwardly to provide flanges 4.

Lamp assembly 2 comprises a combination partition, or light divider, and lamp socket mount 5, molded as an integral unit from suitable opaque electrical insulating material. Element 5 includes a relatively thick base portion 6, square in plan and dimensioned to fit snugly within housing 1. Portion 7 of element 5, constituting the partition or light divider, includes two flat webs 8, 9 disposed each at right angles to the plane face of base 6 and also at right angles to each other so that, when assembly 2 is in place in housing 1, webs 8 and 9 can be said to intersect or join each other along the central longitudinal axis of the housing. Hence, webs 8, 9 divide the interior of the housing into four longitudinally extending spaces and also divide the face of base portion 6 into four square areas 6'.

In each area 6' of base portion 6, there is mounted a conventional, miniature, bayonet type lamp socket 10 in such fashion that the lamp-receiving portion of each socket is adjacent webs 8, 9 while the electrical connectors 11 for the sockets are disposed on the side of base portion 6 opposite webs 8, 9. Webs 8, 9, while substantially shorter than housing 1, are of such length that, when lamps 12 are fully seated in sockets 10, the free ends of webs 8, 9 project beyond the tips of lamps 12. In this regard, it will be noted that the free ends of webs 8, 9 are straight line edges disposed in a common plane, which plane is at right angles to the central axis of housing 1 when assembly 2 is in place.

Housing 1 is advantageously of strong but ductile metal, such as brass, and assembly 2 is secured in place by indenting the walls of the housing inwardly, as indicated at 13, FIG. 1, into engagement with the side edges of base portion 6.

Opposite webs 8, 9, base 6 is provided with a central bore extending longitudinally relative to housing 1, and an interiorly threaded insert 14 is disposed therein to receive a mounting screw 15. Retained by screw 15 is a bracket member 16 having a base 17 and two parallel legs 18 spaced so as to lie each against a different one of two opposite side faces of housing 1, as shown. Base 17 has a central opening through which screw 15 projects into insert 14. Threading of the screw into the insert is thus effective to move flanges 4 and the tips of legs 18 together, so that the edge portion of a panel or the like 19 can be clamped therebetween and the indicating device thus mounted on the panel.

Light transmitting means 3 includes a single block 20 of transparent solid material having good optical transparency, e.g., any of the conventional polymerized methyl methacrylate resin compositions. Block 20 is square in transverse cross-section, dimensioned to fit snugly within housing 1, both end faces of the block being plane faces lying at right angles to the central axis of housing 1 when the block is disposed therein. At its inner end face, block 20 has cemented thereto four filter elements 21, each of a different color, the four filters being identical, thin elements, square in plan and of such size that each completely covers one quarter of the end face of block 20. Accordingly, considering that the filter elements 21 also engage the free ends of webs 8, 9, as will be clear from FIGS. 1 and 2, each element 21 overlies the end of a different one of the four lamp-accommodating spaces defined by webs 8, 9. Hence, before entering block 20, light from any of lamps 12 must pass through the one of filter elements 21 disposed adjacent to the particular lamp. Since the four filter elements are of different colors, activation of a selected lamp will supply a light of a selected color to block 20.

Block 20 extends to the flanged open end of housing 1 and is there provided with a translucent display plate 22 cemented directly to the end face of the block. Plate 22 is square in plan and of such size as to extend laterally beyond the side faces of block 20, projecting past flanges 4 to hide the same.

Advantageously, light transmitting means 3 is detachably secured to the lamp assembly 2, as by a laterally compressible "banana prong" 22 secured to and projecting from the face of block 20 which carries filter elements 21, prong 20 being axially centered for engagement in a receptacle 23 secured in a suitable central bore in that portion of unit 5 at the juncture of webs 8 and 9. In order to orient or key block 20 in housing 1, the housing is provided with an inwardly directed projection 24, FIG. 3, disposed to engage a matching shoulder 25 on block 20.

Block 20 is optically clear, functioning to transmit light passed through any of the filter element 21. Plate 22 serves as a diffusing element, so that light passing through any one of the filter elements 21 and transmitted by block 21 illuminates the entire face of plate 22. Plate 22 can be made of any of the cloudy acrylic resin compositions, for example.

The combination partition and lamp socket mount 5 is molded as an integral unit from an opaque phenolic resin composition, for example, and is so dimensioned that, when the device is assembled as shown in FIGS. 1 and 2, the combination partition and lamp socket mount 5 cooperates with housing 1 to define four chambers, one for each lamp 12, with each such chamber being closed against the escape of light except via the appropriate one of light filters 21.

It will thus be apparent that selective energization of any of the lamps 12 will cause the front face of plate 22 to be substantially uniformly illuminated in a particular color dependent upon which lamp is energized, it being understood that filter elements 21 are each of a different color and that, because of the construction and disposition of unit 5 and filter elements 21, the light from any lamp 12 can pass through only a single one of the filter elements.

FIG. 5 illustrates a modification of the embodiment of the invention shown in FIGS. 1–4. In the modified form of the device, the light transmitting means 3ª comprises four identical, optically transparent blocks 20ª, each of square transverse cross-sectional equal to one quarter of the square transverse cross-section of block 20, FIG. 1. The four blocks 20ª are assembled to form a light transmitting assembly of square transverse cross-section but are separated by thin, flat sheets of opaque material, as indicated at 26 so that light introduced into one of the blocks 20ª is prevented from entering any of the other blocks 20ª. At one end, each block 20ª has cemented to its face a square filter element 21ª, the four elements 21ª being of different colors. Light barriers 26 extend between the adjacent side edges of the filters. The four blocks 20ª are each flanged outwardly along two sides, as indicated at 22ª, to provide flange means to coact with the flanges 4, FIG. 1, of the housing, it being understood that the light transmitting means 3ª, FIG. 5, simply replaces means 3 of FIG. 1.

Employing the modified form of light transmitting means shown in FIG. 5, energization of any one of the four lamps 12 results in illumination of one quarter only of the front face of the light transmitting means, the color of the illumination depending upon the particular lamp, and thus the particular one of filter elements 21ª, involved. With this construction, two or more of the lamps can be energized simultaneously, with resultant simultaneous display of two or more illuminated areas, so that greater flexibility in use is made possible.

FIGS. 6–10 illustrate another embodiment of the invention including electrical switch means arranged for manual actuation by movement of the light transmitting means. Referring first to FIGS. 7 and 8, taken in view of FIG. 6, it will be seen that this embodiment comprises a housing 31, a plurality of lamp units 32 fixed to the housing, an electrical switch assembly 33, a light confining partition 34 and light transmitting means 35, the arrangement being such that the actuator 36 for the switch assembly is operated by manual movement of the combination of light transmitting means 35 and partition 34.

Housing 31 is advantageously an elongated tubular die casting of rectangular transverse cross-section. At its forward end, housing 31 is provided with a frontal opening confined between vertical side flanges 37 and flat top and bottom flanges 38 and 39, the flanges 38 and 39 providing means by which the device can be mounted in the opening of a panel 40. Thus, the panel 40 can be provided with an opening of somewhat smaller extent than the area defined by flanges 38 and 39 and rigid mounting can be accomplished by means of bolts 41 and retaining plates 42.

At its opposite end, housing 31 includes an end wall 43, FIG. 10, provided with a generally U-shaped notch 44 of a size adapted to snugly receive the exteriorly threaded sleeve 45, FIG. 7, which slidably embraces plunger 36 and serves as the mounting means for switch assembly 33. Sleeve 45 carries a fixed flange member 46 and a nut 47 so that, when the sleeve 45 is disposed in notch 44, nut 47 can be actuated to cause end wall 43 to be clamped between the nut and fixed flange 46. It is thus apparent that the switch assembly 33 is rigidly mounted on the end portion of housing 31 opposite the front of the device, with the main portion of the switch assembly disposed outside of the housing but with actuating plunger 36 located within the housing. As will be clear from FIGS. 7 and 8, plunger 36 extends co-axially within housing 31.

Partition 34 consists of an integrally molded opaque rigid element providing four flat but relatively thick web portions 48 extending longitudinally with respect to the housing and arranged in such fashion that the transverse cross-section of the partition is in the form of a cross. Thus, partition 34 is effective, when disposed within housing 31, to divide the interior thereof into four equal longitudinally extending spaces. The outer edge portion of each web 48 is rounded and the partition is so dimensioned that the outer edge portions of webs 48 slidably engage the corresponding inner walls of housing 31, as indicated at 49, FIG. 7. Webs 48 are generally rectangular in plan and the edges thereof which define the ends of partition 34 accordingly lie in planes extending at right angles to the longitudinal axis of housing 31. At one end of the partition such edges of web 48 bear directly on the front edge of switch plunger 36, as indicated at 50 in FIG. 7.

Light transmitting means 35 is disposed forwardly of partition 34 and comprises an elongated, optically transparent, light transmitting block 51 of rectangular transverse cross-section, block 51 being dimensioned to fit snugly but slidably within housing 31. Block 51 has a plane rear face to which are cemented four differently colored filter elements 52. Each filter element 52 is rectangular in plan and of such dimension as to bear on the forward edge portions of two of the webs 48. Filter elements 52 are of such size as to cooperate to completely cover the rear face of block 51, with each element 52 completely closing the forward end of a different one of the four spaces defined by webs 48.

A translucent face-plate 53 is cemented to the front face of block 51. Immediately adjacent to plate 53, two opposite sides of block 51 are provided with notches 54, best seen in FIG. 6, the notches 54 being generally rectangular in shape and both opening into the side face 55 of block 51 disposed between the two opposed surfaces of the block in which the notches are provided. As will be seen in FIGS. 6, 8 and 9, housing 31 is provided with a pair of opposed slots 56 so arranged as to register with notches 54 when block 51 is suitably disposed within the housing, slots 56 being substantially narrower than notches 54, as illustrated in FIG. 8. Cooperating with slots 56 and notches 54 is a generally U-shaped retaining element 57, best seen in FIGS. 6 and 9. Element 57 includes a base 58, extending parallel to face 55 of block 51, and a pair of legs 59 of such thickness and location that the legs 59 can each be slidably disposed within a different one of the slots 56. At its tip, each leg 59 is provided with an inwardly directed extension 60.

The lower portions of slots 56 extend completely through the corresponding side walls of housing 31, while the upper portions of slot 56 constitute recesses in the rear face of flange 38, such recesses opening rearwardly above the top wall of housing 31. At their tops, slots 56 are closed in part by outwardly projecting shoulders 61, FIG. 9, provided by the rear face of flange 38. The extensions 60 on legs 59 of retaining element 57 are so dimensioned as to allow free insertion of the legs 59 into slots 56. However, when legs 59 are fully inserted into slots 56, it will be seen that the extensions 60 project laterally from the main portions of legs 59 by distances sufficient to assure that the extension 60 will engage in notches 54 in light transmitting block 51. It is to be understood that legs 59 are somewhat thinner than the width of slots 56. Hence, during insertion of the legs into slots 56, element 57 can be tilted slightly away from flange 38 until extensions 60 have passed below shoulder 61, at which time the element 57 is moved to a position at right angles to the longitudinal axis of the housing, so that legs 59 are aligned precisely with slots 56. Such assembly is accomplished with the upper retaining plate 52 removed. When that retaining plate is put in place and secured by the corresponding bolt 41, it is obvious that element 57 can no longer be removed.

Axially with respect to housing 31, the width of notches 54 is substantially greater than the thickness of extensions 60. This difference between the width of notches 54 and the thickness of extensions 60 is made sufficient to allow block 51 to be moved within the housing to an extent equal to the actuating movement which it is desired to impart to switch plunger 36. The switch assembly 33 includes a pivoted actuating plate 62 which is spring biased against the end of plunger 36 opposite partition 34, so that plunger 36 is urged resiliently against the partition and the partition in turn is urged resiliently into contact with the filter elements 52 carried by light transmitting block 51. Accordingly, the various parts normally occupy the positions seen in FIG. 7, with the edges of notches 54 which are nearer the partition being engaged with extensions 60 of retaining element 57. It will be obvious that the operator is able to place a finger on plate 53, exposed between side flanges 37, and so apply pressure in opposition to the spring biasing force existing on plunger 36. It is thus possible to move light transmitting block 51 farther into housing 31. This movement of block 51 causes a corresponding movement of partition 34 which is in turn imparted by the partition to plunger 36, causing the plunger to move through a distance adequate to effect operation of the two switches 63 provided in the switch assembly. When the operator removes his finger from plate 53, the spring force biasing plunger 36 toward partition 34 is effective to return the plunger, the partition and the light transmitting block 51 to the normal positions illustrated in FIG. 7.

It is accordingly evident that the notches 54 in block 51 and the extension 60 on legs 59 of retaining element 57 cooperate not only to prevent block 51 from being removed from housing 31 so long as element 57 is in its lowered position, but also to limit the reciprocation or slidable movement of block 51 within housing 31 to an extent which is suitable for operation of the switches 63 of switch assembly 33. Element 57 can, however, be elevated to the raised position seen in FIG. 9, in which extensions 60 are out of engagement with notches 54. In that event, block 51 is free to be removed from housing 31, allowing partition 34 also to be removed from the housing.

Referring to FIG. 6, it will be noted that the top wall of housing 31 is provided with a rectangular opening 64 accommodating two of the lamp units 32. The bottom wall of housing 31 is similarly provided with an identical rectangular opening which accommodates two of the lamp units 32, as will be clear from FIG. 7. Each lamp unit 32 comprises a main body 65, of rigid electrical insulating material, a lamp socket 66 and lugs 67 connected to the socket to supply electrical current to the lamp 68. Body 65 includes a rectangular portion 69, disposed within opening 64, and an outer, larger portion 70 providing a shoulder disposed in engagement with the outer surface of housing 31. Each lamp unit 32 is cemented in place, with its lamp 68 disposed in the space within housing 31 defined by two adjacent ones of the webs 48. As will be clear from FIG. 10, the lamp socket 66 and those portions of body 65 which extend within housing 31 are so dimensioned as not to be in physical contact with any portion of the partition 34. Thus, the lamp units 32 are so mounted on housing 31 that the partition 34 is completely free for axial movement relative to the housing, as is necessary for actuation of the switch assembly 33.

As to operability of the units 32, the partition 34 and the light transmitting means 35 with respect to selective illumination of the translucent plate 53, it will be obvious that this embodiment of the invention functions in the same manner as hereinbefore described with reference to the embodiment shown in FIGS. 1–4. In the present embodiment, however, the partition 34 and the light transmitting means 35 also function to transmit an actuating force to the plunger 36 of the switch means 33.

As is well known in the art, the switch assembly 33 can either be electrically independent of the lamp system, or can be related electrically thereto. Thus, the switches can be employed to control an extraneous circuit, with actuation of the switches being accomplished manually when a particular indication is given by the illuminated indicator. On the other hand, the switches 63 can also be used to effect a direct control of the lamp system, where this is desirable.

FIGS. 11–15 illustrate a modified form of the combination illuminated indicator and switching device just described. In this modified form, the lamps are carried directly by the partition, and move therewith, so that the need for providing lateral openings in the housing of the device, to accommodate separate lamp units, is eliminated. Referring to FIG. 11, it will be seen that housing 31$^a$ is substantially identical with the housing illustrated in FIG. 7, save that the lateral openings 64, FIGS. 6 and 7, are eliminated and that, adjacent end wall 43$^a$, the housing is provided with a pair of small openings 71, FIG. 15, via which flexible leads for the lamp sockets can extend. The switch means 33$^a$ and the light transmitting means 35$^a$ are identical with the corresponding elements illustrated in FIGS. 6–10 and will not be further described.

In this embodiment, the partition 34$^a$ includes, in addition to webs 48$^a$, an intermediate body 72 of rectangular transverse cross-section. Thus, body 72 includes portions substantially completely closing the spaces defined by adjacent ones of the webs 48$^a$. Each such portion includes a forwardly opening recess 73, FIGS. 11 and 13, in each of which is mounted one of the four lamp sockets 66ª, as shown. The electrical connector lugs 67ª project laterally from recesses 73 and then extend rearwardly of body 72, via suitable exterior grooves 74 in body 72, as will be best understood from FIG. 14. Grooves 74 have a depth which is greater than the thickness of lugs 67ª and the lugs are so disposed in the grooves as to be completely out of contact with the inner surfaces of housing 31ª.

Insofar as the operation of the illuminated indicating means, and the mechanical actuation of the switch means, are concerned, the embodiment of FIGS. 11-15 operates in the same fashion hereinbefore described with reference to FIGS. 6-10. The embodiment of FIGS. 11-15 has the distinct advantage, however, that the lamps and their sockets and leads combine with the partition 34ª as a unitary assembly, being readily insertable and removable from the housing 31ª. A comparison of FIGS. 6 and 14 will serve to illustrate that the embodiment of the invention seen in FIGS. 11-15 provides a marked saving in assembly time, as compared to the embodiment shown in FIGS. 6-10.

It will be noted that, in all of the embodiments of the invention hereinbefore discussed, the outer edges of the four webs of the light confining partition are elongated and the partitions are so dimensioned that these edges bear directly on the inner faces of the walls of the housing of the device. Particularly in the embodiments of FIGS. 6-10 and FIGS. 11-15, this feature provides for a desirable stability of the partition during its movement axially of the housing for operation of the switch assembly. Where the partition is slidable within the housing, the outer edges of the webs provided by the partition are transversely rounded so that the partition can be dimensioned to bear directly on the housing, yet such engagement will not involve undue frictional forces.

In the embodiments of the invention including a switch assembly, it is to be understood that the switches employed can be of any conventional construction providing that the switch can be actuated by linear movement of a plunger or equivalent member. Since conventional switches of this type normally include spring means biasing the same to a given position, it is advantageous to use this spring means as the force maintaining the light transmitting means in their normal, forward positions. It will be obvious, however, that spring means exterior to the switch assembly can be employed for this purpose, if desired.

What is claimed is:

1. In an illuminated display device, the combination of an elongated hollow opaque housing having an open end and a uniform cross-section throughout the length thereof; solid light transmitting means removably disposed within said open end and substantially completely filling the transverse cross-section of said housing, said light transmitting means including at one end a display face exposed for view and, at the other end, a plurality of color filter elements each occupying less than the total transverse cross-section of said housing; a partition disposed within said housing behind said light transmitting means and comprising a plurality of opaque webs extending axially within said housing and cooperating with said housing to define a plurality of axially extending spaces equal in number to said color filter elements, each of said color filter elements engaging said partition and closing the front of a different one of said spaces; and a plurality of light sources mounted each in a different one of said spaces, said light sources comprising lamps mounted within said housing.

2. In an illuminated display device, the combination of an elongated, hollow, opaque housing having a front end and a rear end; a combination light partition and lamp mount disposed with and secured to said housing adjacent said rear end and including a plurality of flat, opaque webs extending axially relative to said housing, said webs combining with said housing to define a plurality of axially extending spaces, said partition and lamp mount also comprising an integral body extending transversely of the rear of said webs and including lamp mounting portions disposed each in a different one of said spaces; a plurality of lamps mounted each on a different one of said mounting portions and extending forwardly for access thereto through said front end and said spaces; solid, elongated, light transmitting means disposed within said housing and including at one end a display face exposed for view and at the other end a plurality of flat color filter elements extending transversely of said housing, a portion of the rear face of each of said filter elements abutting the front end of at least one of said webs and closing a different one of said axially extending spaces to pass light from only one of said lamps; and means detachably securing said light transmitting means in said housing to permit removal of said light transmitting means therefrom, said lamps being accessible through the front end of said housing upon removal of said light transmitting means.

3. In an illuminated display device, the combination of an elongated, hollow, opaque housing having a substantially uniform cross section throughout the length thereof, said housing having a front end and a rear end, a lamp mount disposed within and fixedly secured to said housing adjacent said rear end, an opaque partition integral with said lamp mount and extending forwardly thereof toward but terminating short of the said front end, said partition cooperating with said housing to divide the interior thereof into a plurality of axially extending spaces, a plurality of lamps mounted on said lamp mount, each of said lamps being disposed in a different one of said spaces and facing toward said front end for access to said lamps through said front end, solid light transmitting means comprising a block of optically transparent material, a light diffusing element secured to one end of said block and exposed for view, and a plurality of flat color filter elements secured to and completely covering the rear end of said block, the number of said filter elements corresponding to the number of said lamps and said spaces, and means detachably securing said light transmitting means within said front end so that the forward end of said partition abuts the rear faces of said color filter elements to permit light from only one of said lamps to pass through each of said color filter elements, said securing means being operative to permit removal of said light transmitting means to afford access to said lamps.

4. An illuminated display device in accordance with claim 3 including a support member having an aperture through which said housing extends, said front end of said housing having an outwardly extending portion engaged with one side of said support member, and a clamp detachably secured to engage the other side of said support member and support said housing thereon.

5. An illuminated display device in accordance with claim 4 wherein said diffusing element is of larger transverse cross section than and abuts the front of said outwardly extending portion.

6. In a combination illuminated display and switching device, the combination of an elongated hollow housing; switch means mounted at one end of said housing and including a movable actuating member facing the interior of said housing; a partition disposed within said housing adjacent said actuating member, said partition including a plurality of opaque webs extending axially of said housing and disposed in slidable engagement with said housing, said webs cooperating with said housing to define a plurality of axially extending spaces; a plurality of lamps mounted each in a different one of said spaces; and solid light transmitting means slidably disposed within said housing at the end of said housing opposite said switch means, said light transmitting means including at one end an exposed display surface and at the other end a plurality of color filter elements, said color filter elements engaging the ends of said webs and each closing a different one of said axially extending spaces, forces applied to said display surface in a direction axially inward with respect to said housing being effective to move said light transmitting means and said partition in a direction to cause said partition to engage said actuating member and actuate said switch.

7. A device in accordance with claim 6 and further comprising retaining means carried by said housing and operatively associated with said light transmitting means to prevent withdrawal of the latter from said housing.

8. A device in accordance with claim 6 and wherein said lamps are mounted on said partition.

9. An illuminated display device in accordance with claim 6 wherein said lamps are mounted within said housing.

10. A device in accordance with claim 8 and wherein said partition includes a body integral with said webs and substantially filling the cross-section of said housing, said body including mounting portions disposed each in a different one of said axially extending spaces, said lamps being mounted each on a different one of said mounting portions.

11. In a combined illuminated display and electrical switching device, the combination of an elongated tubular housing having an open end; solid elongated light transmitting means slidably disposed in said housing adjacent said open end, said light transmitting means having at one end a display face exposed for view and at the other a plurality of color filter elements; means carried by said housing at said open end and engageable with said light transmitting means to limit axial movement thereof; a partition slidably disposed in said housing for movement axially thereof, said partition comprising a plurality of opaque, axially extending webs cooperating with said housing to define a plurality of axially extending spaces, said webs engaging said filter elements and each of said filter elements closing a different one of said axially extending spaces; switch means mounted on said housing at the end thereof opposite said light transmitting means, said switch means including an actuating member disposed in contact with the end of said partition opposite said filter elements, said actuating member being resiliently biased toward said partition, forces applied to said light transmitting means in a direction axially inward of said housing being effective to move said partition to cause the same to actuate said switch means; and a plurality of lamps mounted each in a different one of said axially extending spaces.

12. A device in accordance with claim 11 and wherein said light transmitting means is provided with a pair of lateral notches and said means carried by said housing for limiting movement of said light transmitting means comprises a U-shaped retaining member, the legs of which are engaged in said notches.

13. In a combined illuminated display and electrical switching device, the combination of an elongated hollow housing of polygonal transverse cross-section, said housing having an open end; an elongated solid light transmitting unit of like polygonal transverse cross-section slidably disposed in said housing adjacent said open end, said unit substantially filling the transverse cross-section of said housing and having at one end a display face exposed for view and the other end a plurality of flat color filter elements lying in a common plane transverse to said housing; an integral partition unit slidably disposed within said housing and comprising a plurality of flat axially extending webs arranged to define, with said housing, a plurality of axially extending spaces equal in number to said color filter elements, one end of said partition unit engaging said filter elements and each of said filter elements closing a different one of said spaces; switch means mounted on said housing at the end thereof opposite said light transmitting means and comprising a reciprocable actuating member extending within said housing into engagement with said partition unit; and a plurality of lamps mounted each in a different one of said spaces.

14. In a combined illuminated display and electrical switching device, the combination of a rigid, hollow, elongated housing of polygonal transverse cross-section, said housing having an open end; switch means mounted on said housing and comprising a reciprocable actuating member projecting toward the open end of said housing; a combined partition and lamp mount slidably disposed within said housing and comprising a body having substantially the same transverse cross-section as said housing and a plurality of webs extending from said body axially of said housing toward said open end, said webs combining with the walls of said housing to define a plurality of axially extending spaces, said actuating member being in engagement with said combined partition and lamp mount; a plurality of lamps mounted on said body and disposed each in a different one of said axially extending spaces; and a solid light transmitting unit slidably disposed in said housing and having a display face exposed at said open end, said light transmitting unit being in engagement with the ends of the webs of said combined partition and lamp mount.

15. In a combination illuminated display and switching device the combination of an elongated, hollow, opaque housing having a front end and a rear end, switch means mounted at said rear end and including a movable actuating member extending forwardly in the interior of said housing, means dividing the interior of said housing into a plurality of axially extending spaces, said means including a partition slidably disposed in said housing; a plurality of lamps each mounted in a different one of said spaces, and solid light transmitting means slidably disposed within said housing adjacent the front end thereof and opposite said switch means, said light transmitting means including at one end an exposed display surface and at the other end a plurality of flat color filter elements, said color filter elements abutting the front end of said partition and each closing a different one of said axially extending spaces, forces applied to said display surface in a direction axially toward the rear of said housing being effective to move said light transmitting means and said partition in a direction to cause said partition to engage said actuating member and actuate said switch.

References Cited in the file of this patent

UNITED STATES PATENTS

| | | |
|---|---|---|
| 2,295,301 | Smith | Sept. 8, 1942 |
| 2,692,921 | De Goff | Oct. 26, 1954 |
| 2,710,956 | Hallerberg et al. | June 14, 1955 |
| 2,756,412 | Harrington | July 24, 1956 |

FOREIGN PATENTS

| | | |
|---|---|---|
| 1,087,890 | France | Sept. 1, 1954 |